(12) United States Patent
Dallum et al.

(10) Patent No.: US 8,532,235 B2
(45) Date of Patent: Sep. 10, 2013

(54) UWB DELAY AND MULTIPLY RECEIVER

(75) Inventors: Gregory E. Dallum, Livermore, CA (US); Garth C. Pratt, Discovery Bay, CA (US); Peter C. Haugen, Livermore, CA (US); Carlos E. Romero, Livermore, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 789 days.

(21) Appl. No.: 12/637,793

(22) Filed: Dec. 15, 2009

(65) Prior Publication Data

US 2010/0232472 A1 Sep. 16, 2010

Related U.S. Application Data

(60) Provisional application No. 61/138,371, filed on Dec. 17, 2008.

(51) Int. Cl.
*H04L 27/08* (2006.01)

(52) U.S. Cl.
USPC ..... 375/345; 375/256; 455/234.1; 455/239.1; 455/242.1; 455/250.1

(58) Field of Classification Search
USPC ................. 375/140, 141, 147, 239, 240, 256, 375/259, 260, 345; 455/232.1, 234.1, 236.1, 455/239.1, 240.1, 242.1, 242.2, 246.1, 249.1, 455/250.1
See application file for complete search history.

(56) References Cited

U.S. PATENT DOCUMENTS

| 5,345,471 | A | 9/1994 | McEwan | |
|---|---|---|---|---|
| 5,361,070 | A | 11/1994 | McEwan | |
| 5,523,760 | A | 6/1996 | McEwan | |
| 5,805,110 | A | 9/1998 | McEwan | |
| 6,408,168 | B1 * | 6/2002 | Sessink | 455/250.1 |
| 6,545,487 | B1 * | 4/2003 | Ly | 324/620 |
| 7,697,911 | B2 * | 4/2010 | Lai et al. | 455/232.1 |
| 7,729,675 | B2 * | 6/2010 | Krone | 455/234.1 |
| 7,865,150 | B2 * | 1/2011 | McFarland et al. | 455/78 |
| 2007/0297543 | A1 * | 12/2007 | Spiridon et al. | 375/345 |

* cited by examiner

*Primary Examiner* — Dac Ha
(74) *Attorney, Agent, or Firm* — John P. Wooldridge

(57) ABSTRACT

An ultra-wideband (UWB) delay and multiply receiver is formed of a receive antenna; a variable gain attenuator connected to the receive antenna; a signal splitter connected to the variable gain attenuator; a multiplier having one input connected to an undelayed signal from the signal splitter and another input connected to a delayed signal from the signal splitter, the delay between the splitter signals being equal to the spacing between pulses from a transmitter whose pulses are being received by the receive antenna; a peak detection circuit connected to the output of the multiplier and connected to the variable gain attenuator to control the variable gain attenuator to maintain a constant amplitude output from the multiplier; and a digital output circuit connected to the output of the multiplier.

20 Claims, 17 Drawing Sheets

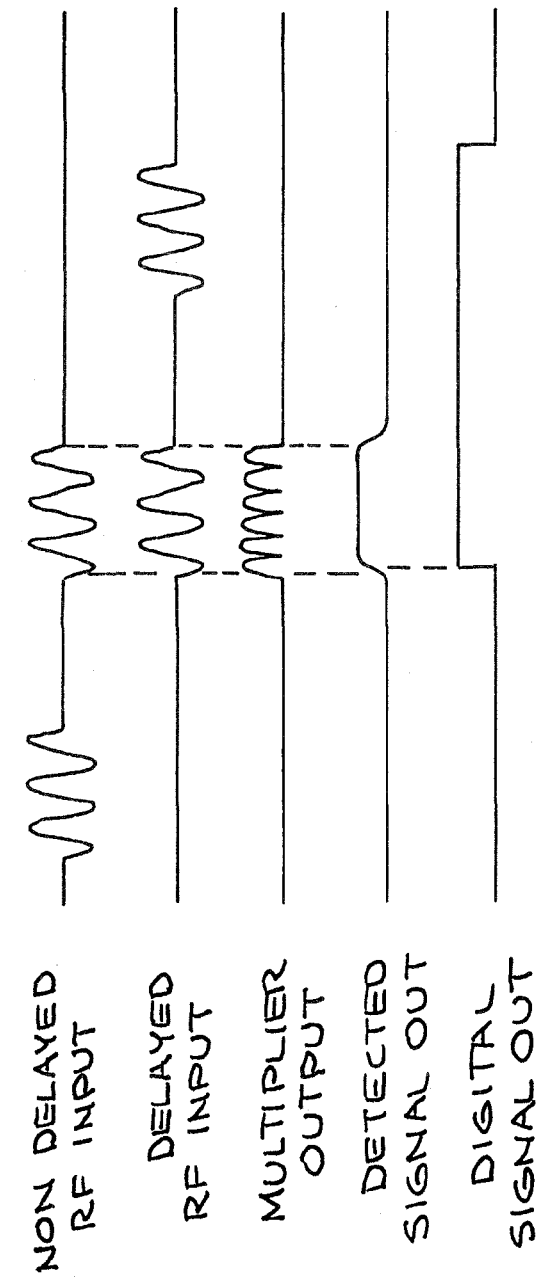
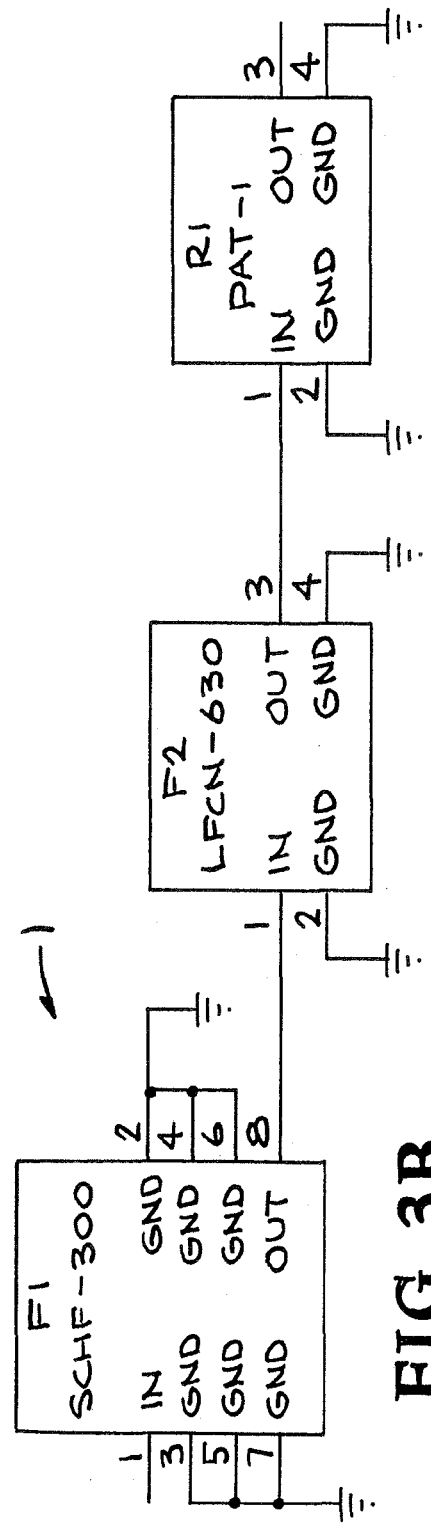
FIG. 2
FIG. 3B

| FIG. 3A-E | FIG. 3A-H |
|---|---|
| FIG. 3A-D | FIG. 3A-G |

| FIG. 3A-B | FIG. 3A-C | FIG. 3A-F |
|---|---|---|

| FIG. 3A-A |
|---|

MAP FOR FIG. 3A

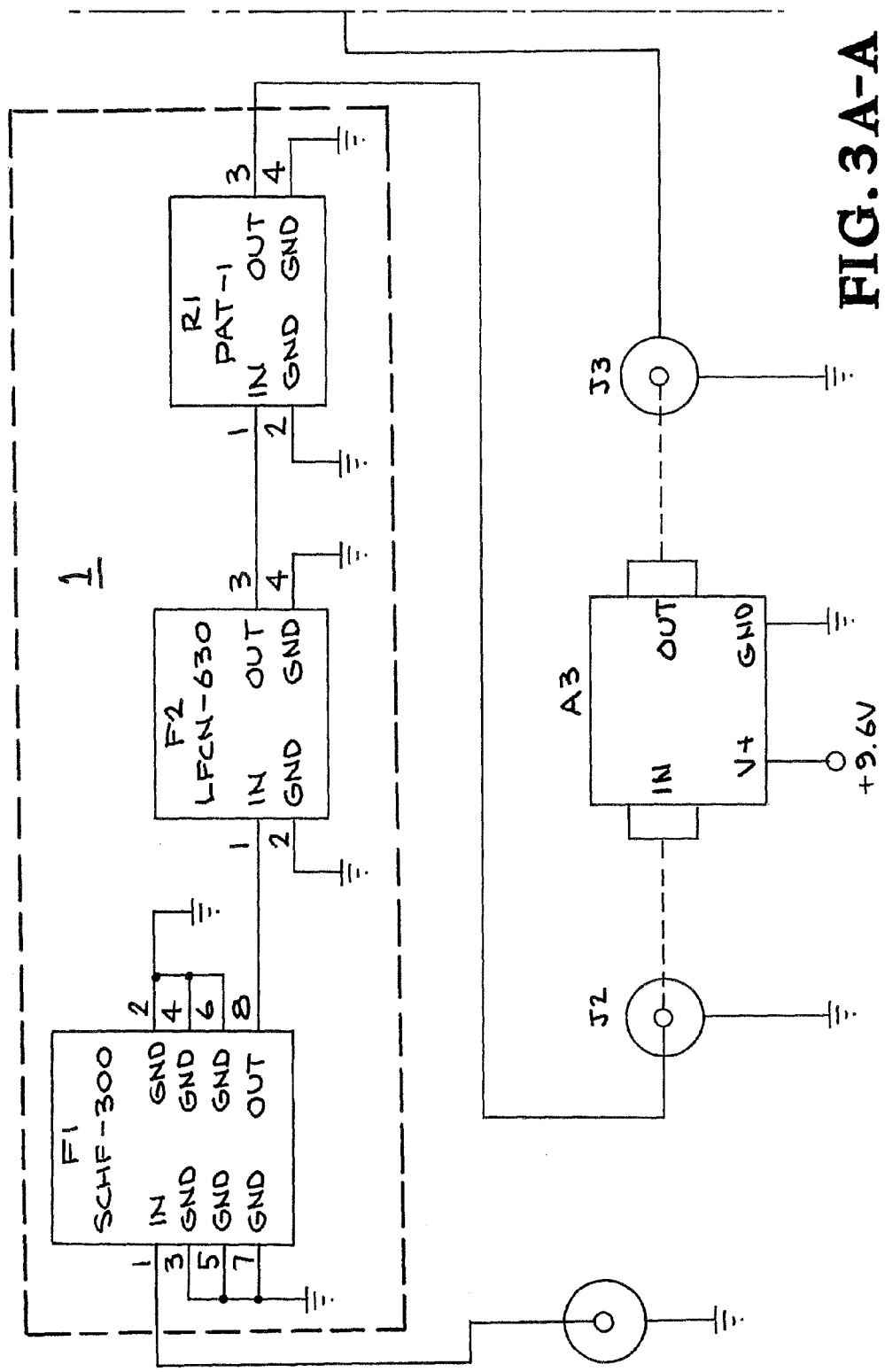
FIG. 3A-A

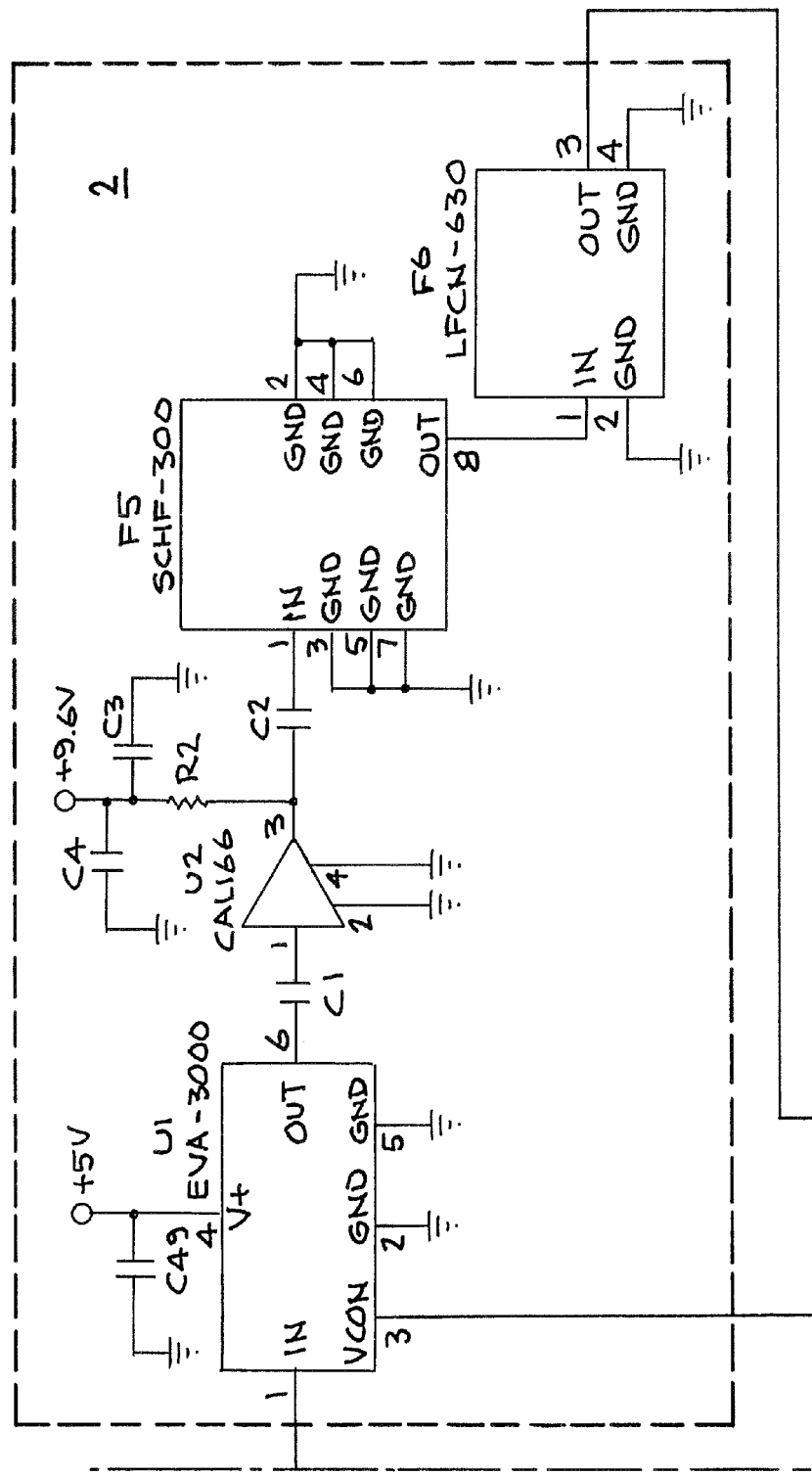
FIG. 3A-B

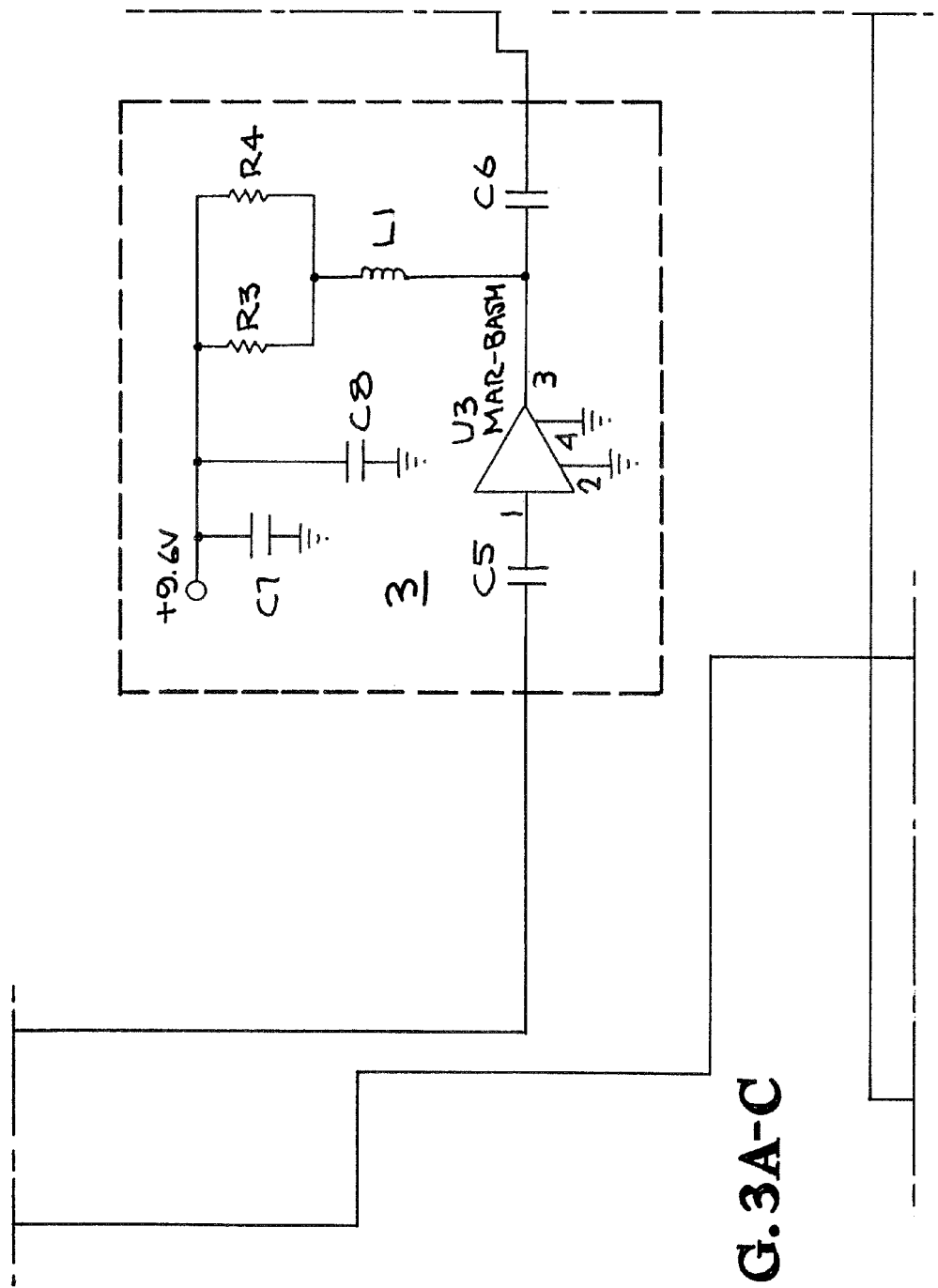
FIG.3A-C

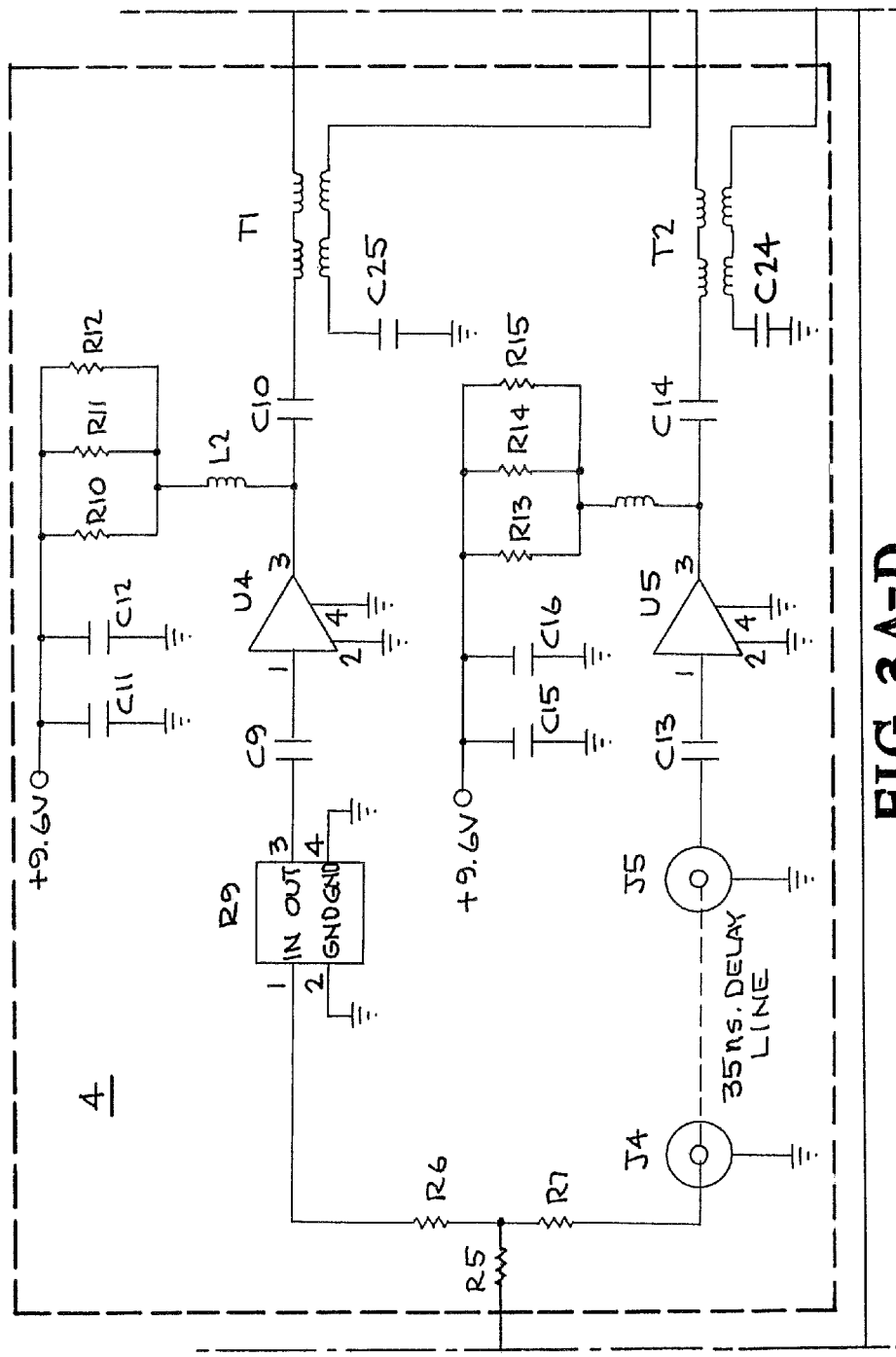
FIG. 3A-D

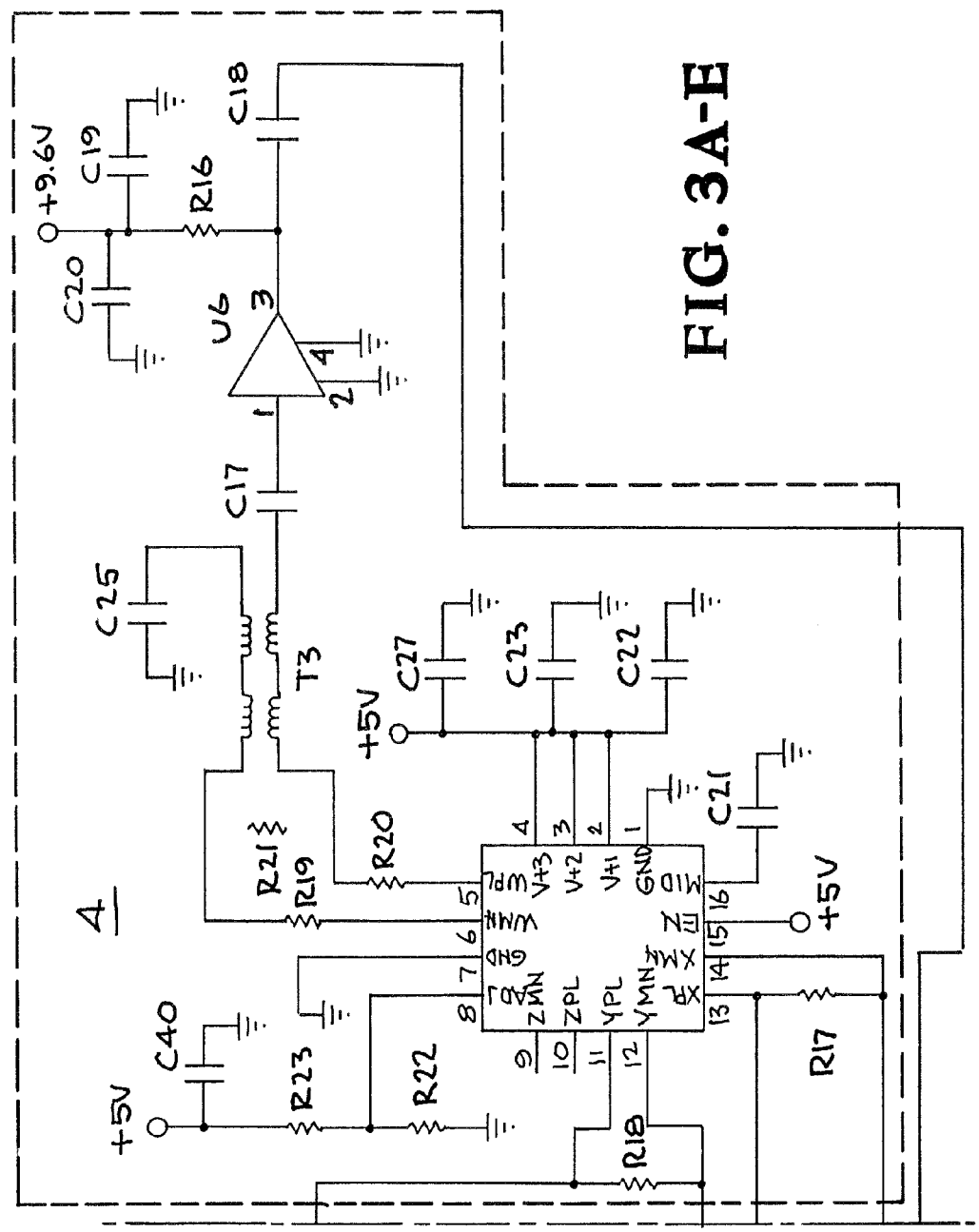
FIG. 3A-E

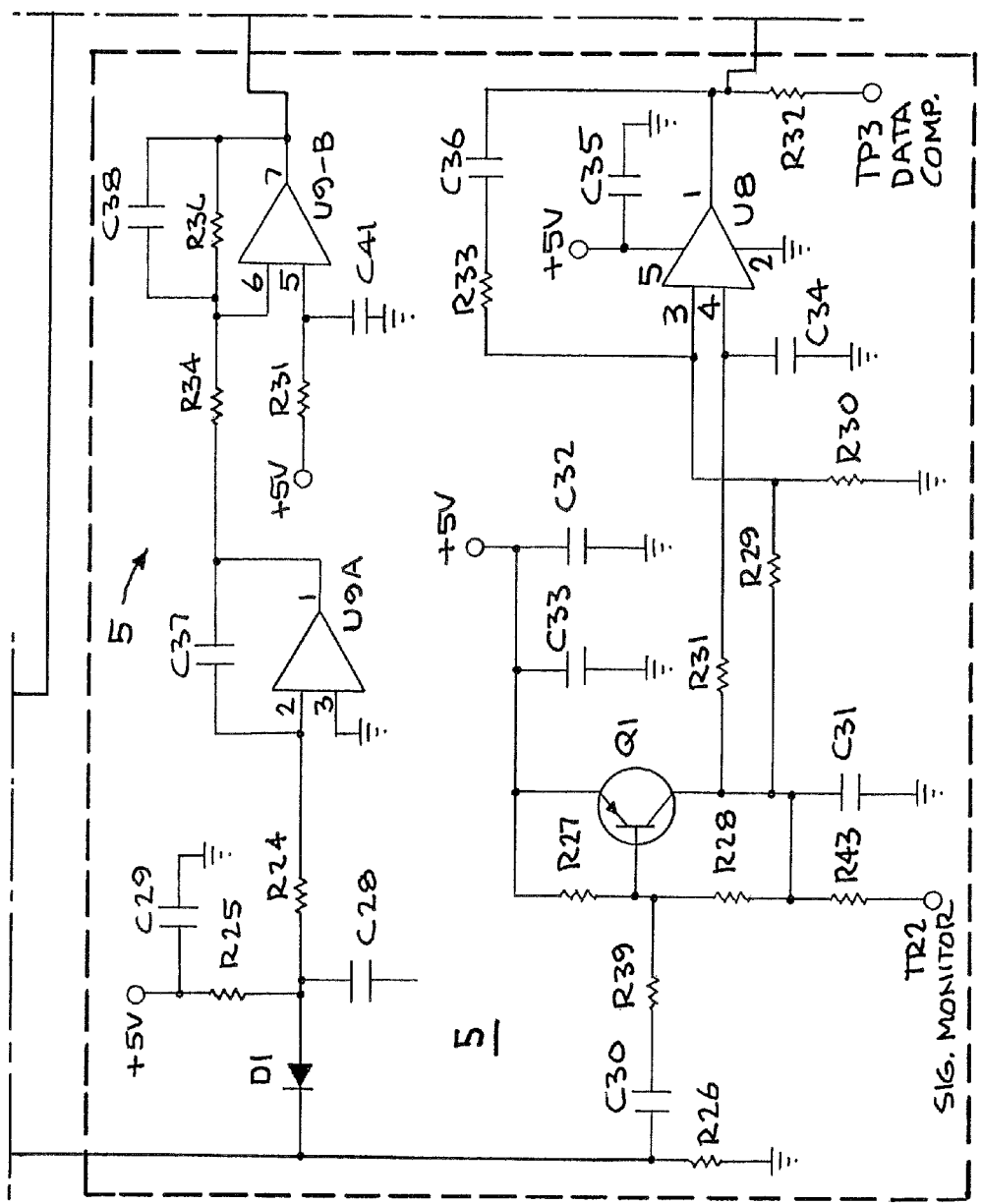
FIG.3A-F

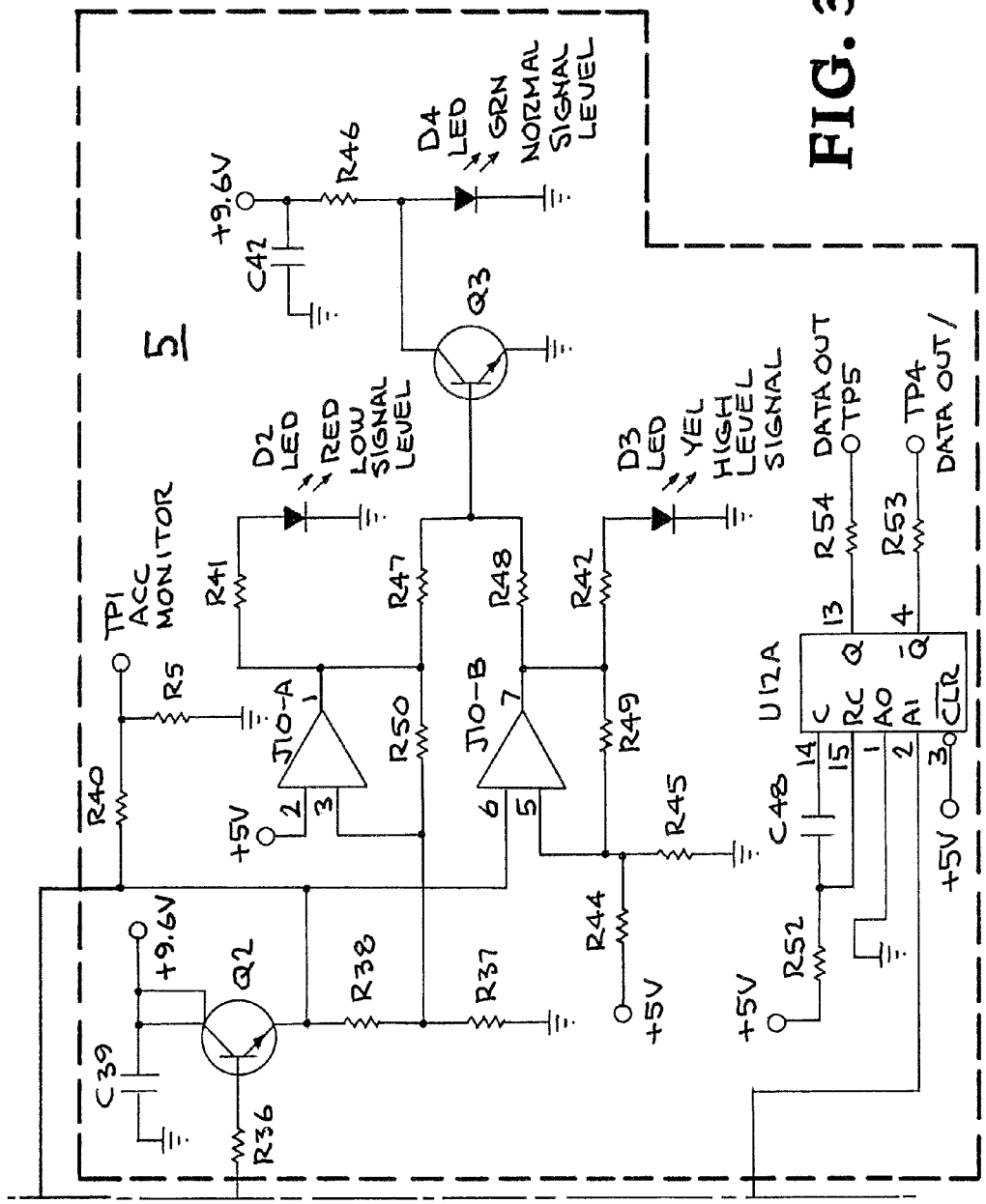
FIG. 3A-G

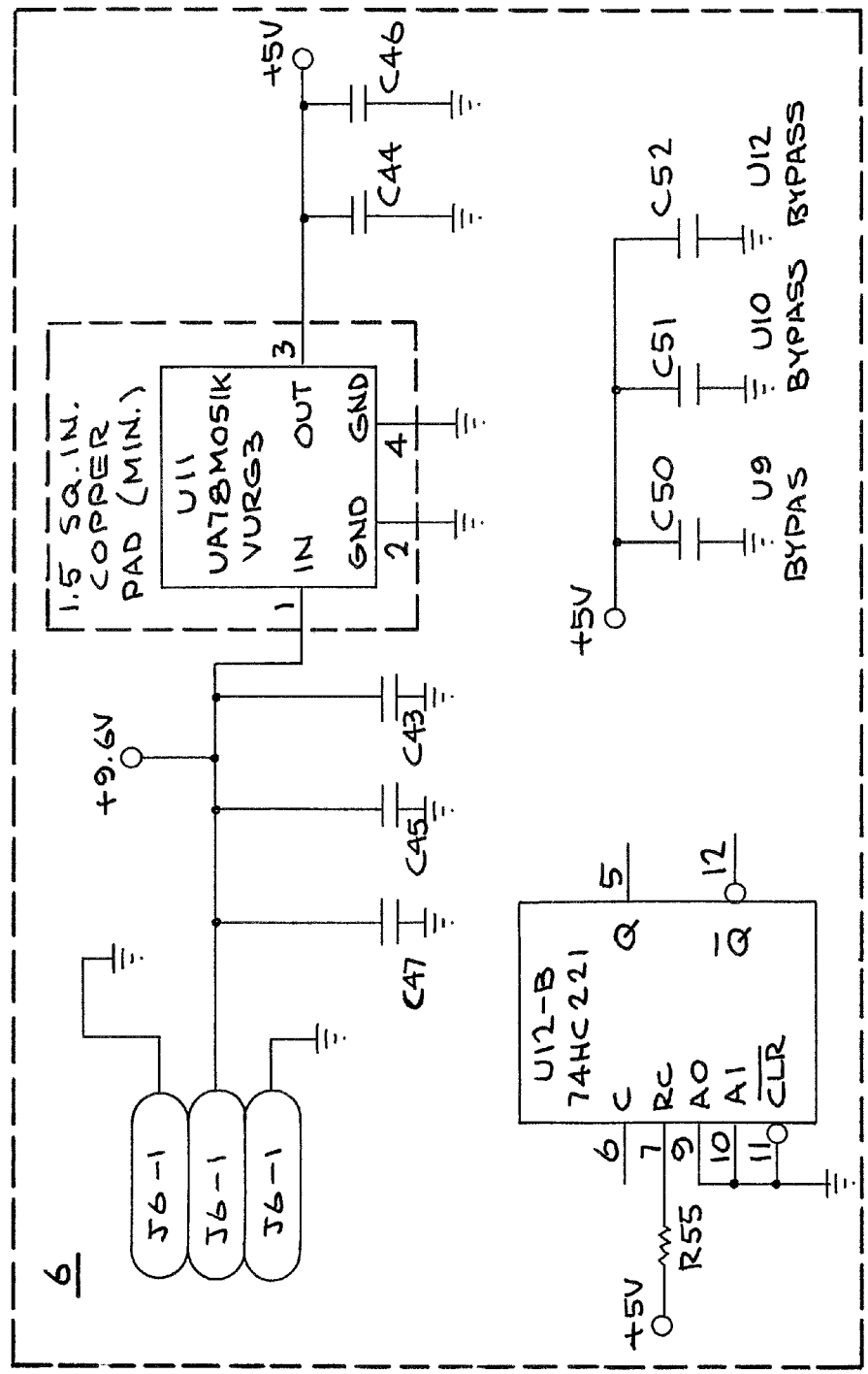
FIG. 3 A-H

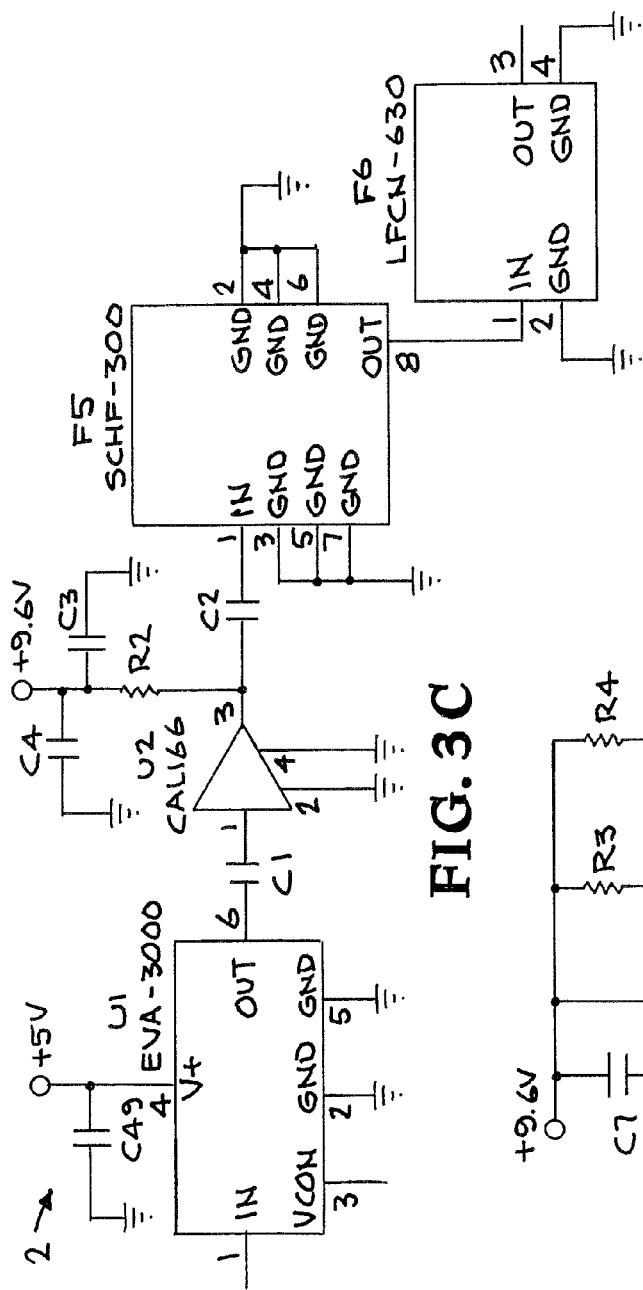
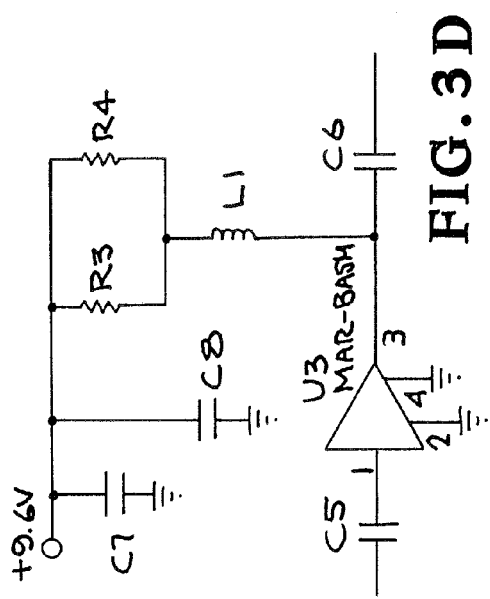
FIG. 3C
FIG. 3D

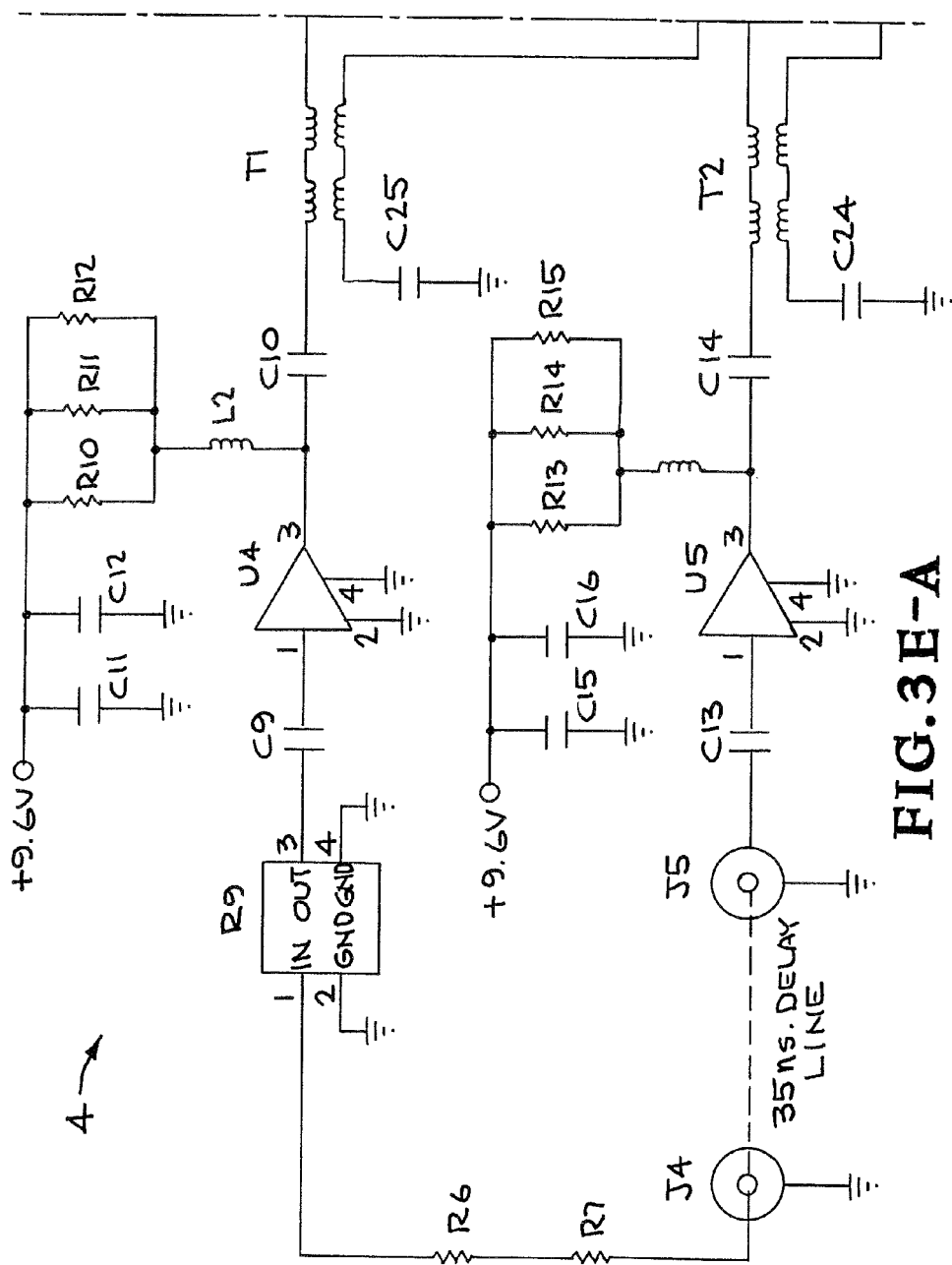
FIG. 3E-A

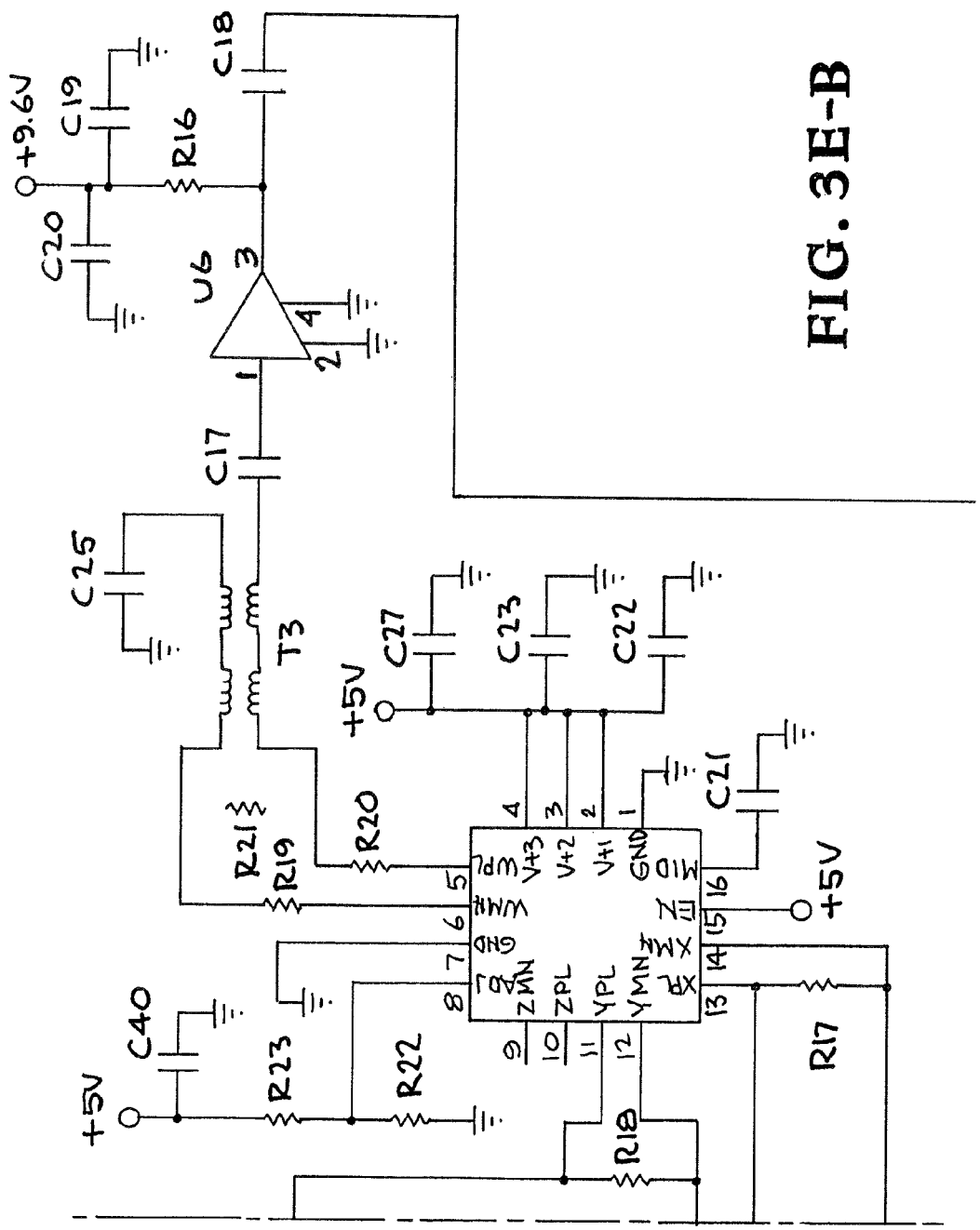
FIG. 3E-B

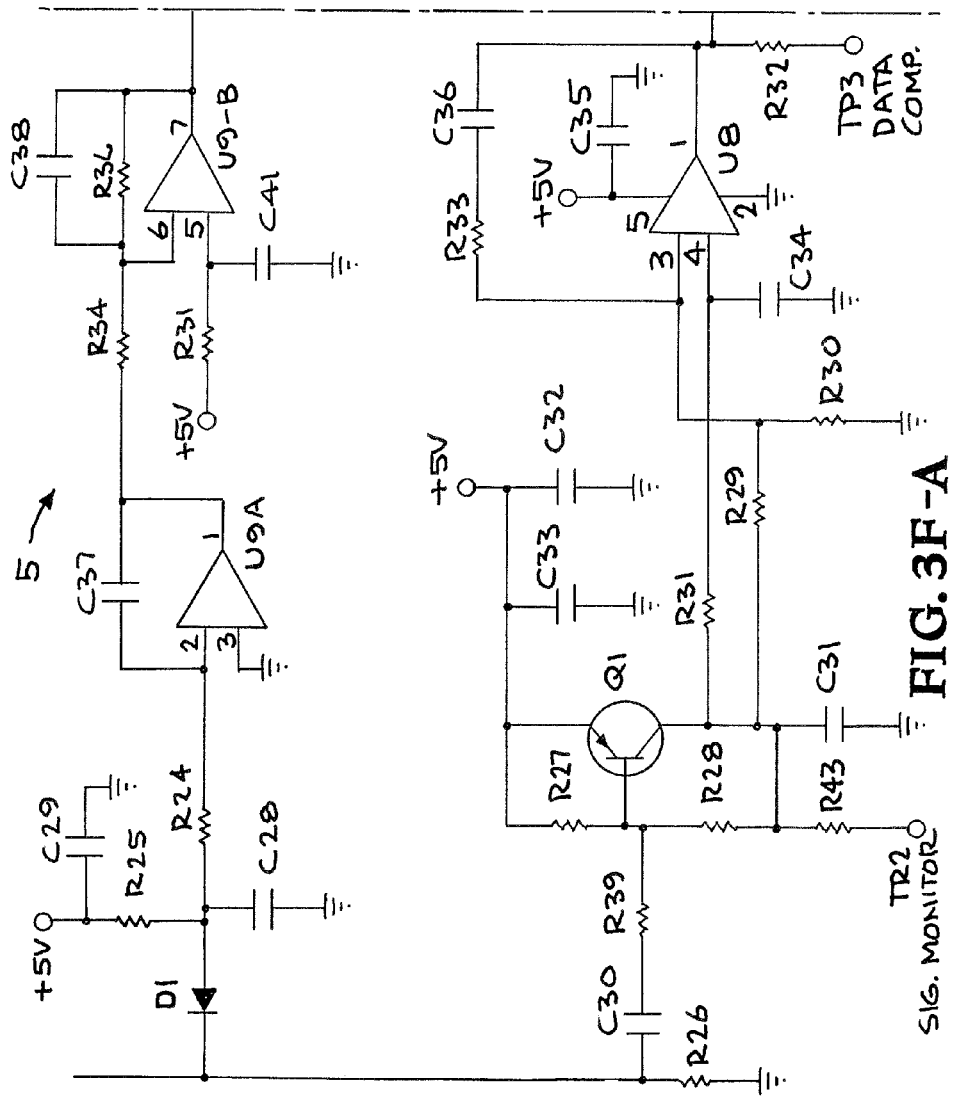
FIG. 3F-A

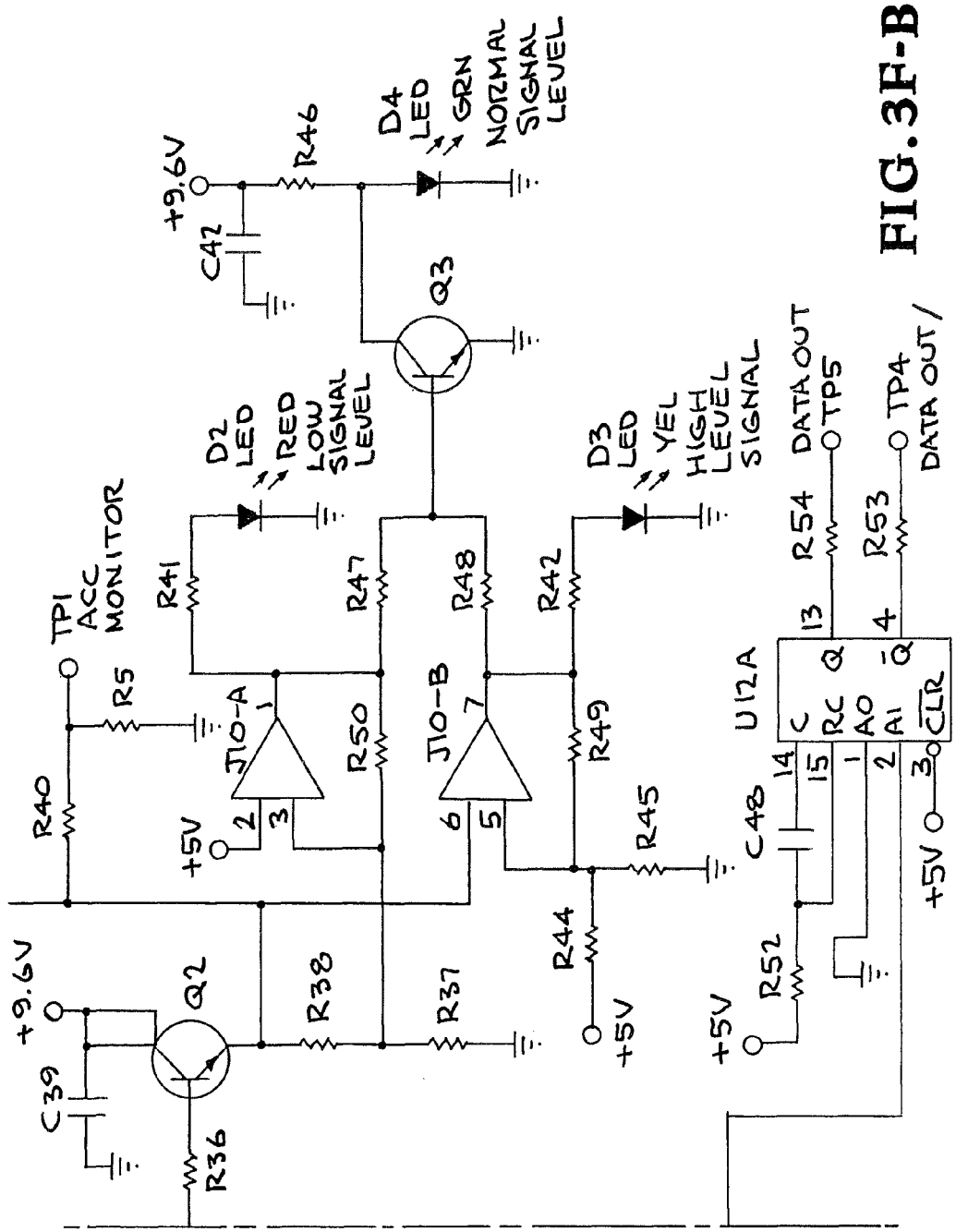
FIG. 3F-B

UWB DELAY AND MULTIPLY RECEIVER

RELATED APPLICATIONS

The application claims priority to U.S. Provisional No. 61/138,371, titled: "UWB Receiver with Automatic Gain Control Implementation," filed Dec. 17, 2008 and incorporated herein by reference.

GOVERNMENT RIGHTS

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

This invention pertains generally to ultra-wideband communications, and more particularly to ultra-wideband (UWB) receivers.

2. Description of Related Art

Ultra-wideband (UWB) wireless communication is based on the transmission of data in extremely short (50-1000 ps) pulses spread out over a broad range or bandwidth (typically several GHz) of the electromagnetic spectrum. Large data bursts, e.g. hundreds of Gb/s, are possible because the data are carried simultaneously at a wide range of frequencies across the electromagnetic spectrum.

UWB communications offers many advantages. UWB signals are more difficult to detect than narrowband (essentially single frequency) signals. The combination of broad spectrum, low power, and extremely short pulses also cause much less interference with other devices than do conventional narrowband wireless systems. Also, UWB is much more resistant to electrical interference from other devices than other wireless technology. Thus, UWB's data capacity, speed, low power requirements, and resistance to interference make it attractive as a communications technology.

UWB pulses spread the transmitted energy over many frequencies, over a band of typically several GHz, as opposed to traditional narrowband, which generally operates as a continuous wave at a specific frequency and covers a limited band of about 30 KHz. Cellular phones operate in the wideband, which covers about 5 MHz. UWB bandwidth provides high capacity, resistance to jamming, and low probability of detection. Thus UWB provides an attractive alternative to the other communications technologies. At present, the FCC restricts commercial UWB systems, but Government use is less restricted. UWB appears very promising for the future.

One type of receiver used in UWB communications systems is a delay and multiply receiver in which a received pulse is multiplied by a delayed prior received pulse to increase the magnitude. This requires a precise spacing between the transmitted pulses so that the delay can be chosen so that the presently received pulses are coincident with the delayed previously received pulses. It is also required that the pulses be in phase so that when they are multiplied they do not cancel out. At a minimum, a pair of pulses is required.

It is desirable to provide an UWB delay and multiply receiver that can be used with such UWB transmitters.

BRIEF SUMMARY OF THE INVENTION

An aspect of the invention is an ultra-wideband (UWB) delay and multiply receiver, formed of a receive antenna; a variable gain attenuator connected to the receive antenna; a signal splitter connected to the variable gain attenuator; a multiplier having one input connected to an undelayed signal from the signal splitter and another input connected to a delayed signal from the signal splitter, the delay between the splitter signals being equal to the spacing between pulses from a transmitter whose pulses are being received by the receive antenna; a peak detection circuit connected to the output of the multiplier and connected to the variable gain attenuator to control the variable gain attenuator to maintain a constant amplitude output from the multiplier; and a digital output circuit connected to the output of the multiplier.

Further aspects of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 is a diagram of the receiver signals for the UWB delay and multiply receiver of FIG. 1.

FIG. 3A is a schematic of an embodiment of the invention.

FIGS. 3B-3G show expanded views of the dashed sections of FIG. 3A.

DETAILED DESCRIPTION OF THE INVENTION

Referring more specifically to the drawings, for illustrative purposes the present invention is embodied in the apparatus generally shown in FIG. 1 through FIG. 3G. It will be appreciated that the apparatus may vary as to configuration and as to details of the parts, without departing from the basic concepts as disclosed herein.

UWB Receiver

The invention includes an ultra-wideband (UWB) receiver used in communications. This receiver utilizes a delay and multiply technique for detecting the UWB transmitted signal. In this approach, the transmitter sends out two identical impulses or RF burst packets that are spaced a fixed interval apart. The receiver amplifies both signals and sends them on two different paths. One path is non-delayed and the other path delays the incoming signal. The time difference between the non-delayed path and the delayed path is equal to the delay spacing of the two transmitted signals. The two receive paths are the inputs to a RF analog multiplier. The detected signal is generated at the output of the multiplier when the two inputs are aligned in phase. The output of the multiplier is then peak or average detected and trips a comparator circuit, which then generates a digital output signal. The output amplitude of the multiplier also is monitored by analog circuitry and drives a variable gain attenuator that is placed in the incoming RF chain. This circuitry adjusts the output level of the detected signal to maintain a constant amplitude.

Figure 1:
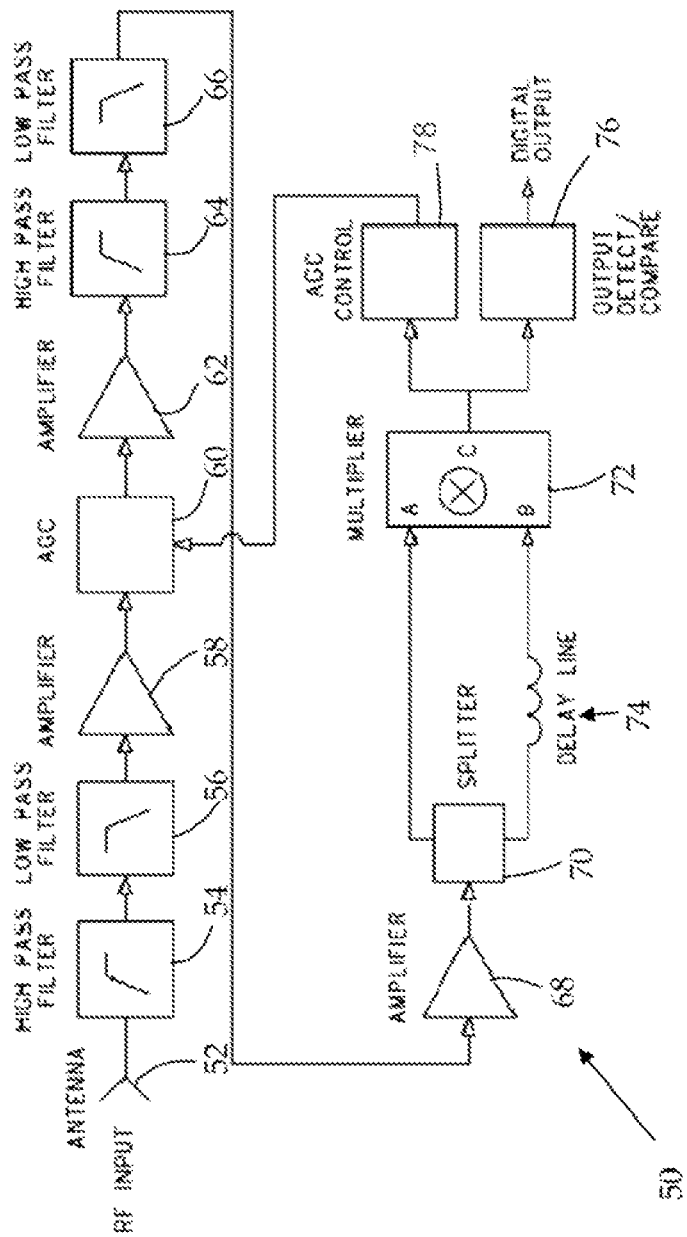
FIG. 1 is a schematic block diagram of an UWB delay and multiply receiver of the invention.

FIG. 1 shows an UWB receiver 50 of the invention. The RF input signal is detected using an antenna 52, which may be an UWB antenna or a narrower band antenna. The choice is dependant on the type of RF that was transmitted. For impulse transmitters, a UWB antenna is preferred. For short burst type transmitters a narrower band antenna may be used. The signal from the antenna is passed through a high pass filter 54 followed by a low pass filter 56. This creates a band pass filter that will pass the desired RF signal, while rejecting other out of band interference sources. The bandwidth of the band pass filter is determined by the antenna used and the type of input signal to be detected. The signal is amplified by amplifier 58 and fed through a voltage variable attenuator (AGC) 60. The signal is amplified further by amplifier 62 and filtered further with another high pass filter 64 and low pass filter 66. This second set of filters further attenuate out of band signals and can be used to narrow the bandwidth further if required. The RF signal is then amplified by amplifier 68 run through a passive splitter 70. There are two equal amplitude signals from the splitter. One of these split signals drives one input of a RF analog multiplier 72. The other split signal passes through a delay line 74 to the other input of multiplier 72. There is an attenuator placed in the first path to equal the losses associated with the passive delay line 74 in the second path. The second input to the multiplier 72 is thus a delayed signal from the passive splitter 70. A coax cable is used in this version to generate the delay. For shorter delays, a micro-strip line or passive delay modules may be substituted. The output of the multiplier 72 is unipolar and either all positive or negative when the receiver delay line is set the same as the transmit output spacing. This is depicted in FIG. 2.

The output of the multiplier 72 drives a peak detector (AGC control) circuit 78 and a digital output circuit (output detect/compare) 76. The peak detector is used to monitor the peak output level of the multiplier 72 and send a control signal to the variable gain attenuator (AGC) 60. This closed loop control maintains a constant amplitude output from the multiplier 72. This control extends the linear operating range of the receiver with varying transmit and receive antenna distances. The digital output circuit 76 includes a fast detect integrator that detects the desired output from the multiplier 72 and slightly filters and stretches this waveform. This filtered signal is the input to an analog comparator which is set to a fixed trigger threshold. The output from this comparator then triggers a digital "one-shot" which further stretches the signal and provides the digital output signal from the receiver.

Embodiments of the invention include unique UWB or short-burst transmit reference communications receiver designs employing automatic gain control, wide bandwidth and multi-transmit energy averaging.

Embodiments are useful as upgrades to existing and new UWB and short burst narrowband communications devices and related systems for improved capabilities (e.g., long range communications, high-multipath communications, LPI/LPD communications).

Figure 3G:
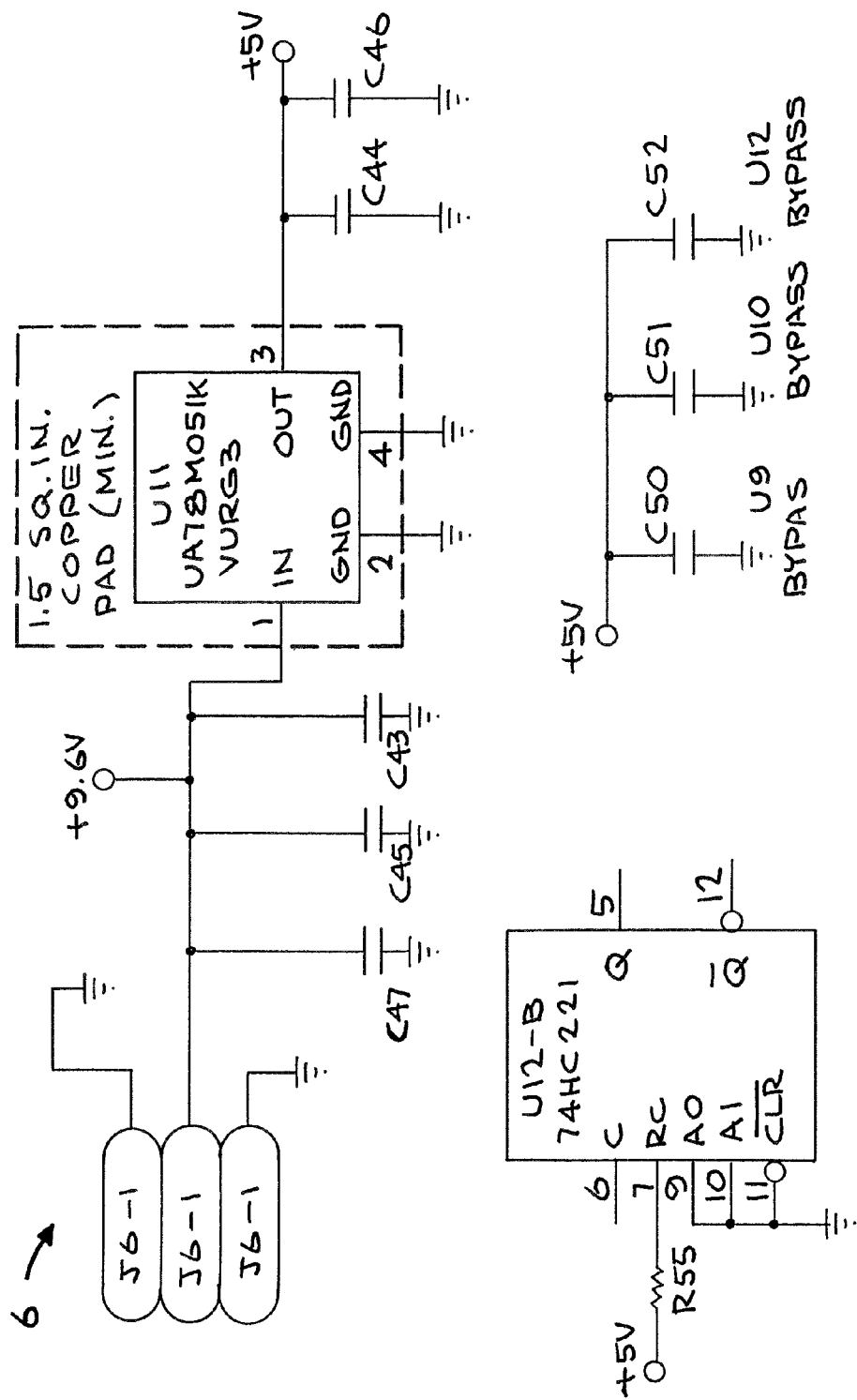

The receiver exemplified in the FIGS. 3A-3G employs a novel architecture to implement automatic gain control (AGC) using wideband filters and attenuators, wideband impulse mixing using a high-bandwith RF and LO input Gilbert cell mixer, and multi-transmit burst or impulse UWB averaging using post-mixer integration. FIG. 3A is a schematic of an embodiment of the invention. FIGS. 3B-3G show expanded views of the dashed sections of FIG. 3A.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An ultra-wideband (UWB) delay and multiply receiver, comprising:
   a receive antenna;
   a variable gain attenuator connected to the receive antenna;
   a signal splitter connected to the variable gain attenuator;
   a multiplier having one input connected to an undelayed signal from the signal splitter and another input connected to a delayed signal from the signal splitter, the delay between the splitter signals being equal to the spacing between pulses from a transmitter whose pulses are being received by the receive antenna;
   a peak detection circuit connected to the output of the multiplier and connected to the variable gain attenuator to control the variable gain attenuator to maintain a constant amplitude output from the multiplier; and
   a digital output circuit connected to the output of the multiplier.

2. The receiver of claim 1, wherein the antenna is a UWB antenna or a narrowband antenna.

3. The receiver of claim 1, further comprising an amplifier and a band pass filter between the antenna and the variable gain attenuator.

4. The receiver of claim 3, further comprising an amplifier and a band pass filter between the variable gain attenuator and the signal splitter.

5. The receiver of claim 1, wherein the multiplier is a RF analog multiplier.

6. The receiver of claim 1, further comprising a delay line connected between the signal splitter and one input of the multiplier to produce the delayed signal.

7. The receiver of claim 6, wherein the delay line is a coaxial cable.

8. A method, comprising:
   providing an ultra-wideband (UWB) delay and multiply receiver, comprising:
   a receive antenna;
   a variable gain attenuator connected to the receive antenna;
   a signal splitter connected to the variable gain attenuator;
   a multiplier having one input connected to an undelayed signal from the signal splitter and another input connected to a delayed signal from the signal splitter, the delay between the splitter signals being equal to the spacing between pulses from a transmitter whose pulses are being received by the receive antenna;
   a peak detection circuit connected to the output of the multiplier and connected to the variable gain attenuator to control the variable gain attenuator to maintain a constant amplitude output from the multiplier; and
   a digital output circuit connected to the output of the multiplier;
   producing the undelayed signal from the signal splitter;
   producing a delayed signal from the signal splitter;

maintaining a constant amplitude output from the multiplier by controlling the variable gain attenuator of the peak detection circuit; and digitizing the output from the multiplier with the digital output circuit.

9. The method of claim 8, wherein the antenna is a UWB antenna or a narrowband antenna.

10. The method of claim 8, further comprising an amplifier and a band pass filter between the antenna and the variable gain attenuator.

11. The method of claim 8, further comprising an amplifier and a band pass filter between the variable gain attenuator and the signal splitter.

12. The method of claim 8, wherein the multiplier is a RF analog multiplier.

13. The method of claim 8, further comprising a delay line connected between the signal splitter and one input of the multiplier to produce the delayed signal.

14. The method of claim 13, wherein the delay line is a coaxial cable.

15. A method, comprising:

passing an RF signal through a variable gain attenuator of an ultra-wideband (UWB) delay and multiply receiver to a signal splitter of said UWB delay and multiply receiver;

producing an undelayed signal from the signal splitter of ultra-wideband (UWB) delay and multiply receiver;

producing a delayed signal from the signal splitter;

inputting the undelayed signal and the delayed signal into two inputs of a multiplier of said UWB delay and multiply receiver;

maintaining a constant amplitude output from the multiplier of said UWB delay and multiply receiver by controlling the variable gain attenuator by a peak detection circuit of said UWB delay and multiply receiver, the peak detection circuit being connected to the output of the multiplier and to the variable gain attenuator; and digitizing the output from the multiplier with a digital output circuit.

16. The method of claim 15, wherein said UWB delay and multiply receiver comprises a receive antenna selected from the group consisting of an UWB antenna and a narrowband antenna.

17. The method of claim 15, further comprising providing an amplifier and a band pass filter between the antenna and the variable gain attenuator.

18. The method of claim 15, further comprising providing an amplifier and a band pass filter between the variable gain attenuator and the signal splitter.

19. The method of claim 15, wherein the multiplier is a RF analog multiplier.

20. The method of claim 15, further comprising providing a delay line connected between the signal splitter and one input of the multiplier to produce the delayed signal.

* * * * *